United States Patent
Wu et al.

(10) Patent No.: US 11,732,492 B2
(45) Date of Patent: Aug. 22, 2023

(54) UHPC MATERIAL FOR REINFORCING EXISTING STONE MASONRY WALL AND REINFORCING METHOD THEREOF

(71) Applicants: Fuzhou University, Fujian (CN); Fujian Huidong Construction Engineering Co., Ltd., Quanzhou (CN); The Eighth Engineering Bureau of China City Investment Group Co., Ltd., Fujian (CN)

(72) Inventors: Yingxiong Wu, Fujian (CN); Wei Huang, Fujian (CN); Zhirong Zhang, Fujian (CN); Yumin Wang, Fujian (CN); Bingtian Wu, Fujian (CN); Xiaoling Duan, Fujian (CN)

(73) Assignees: Fuzhou University, Fujian (CN); Fujian Huidong ConstructionEngineering Co., Ltd., Fujian (CN); The Eighth Engineering Bureau of China City Investment Group Co., Ltd, Fujian (CN)

( * ) Notice: Subject to any disclaimer, the term of this patent is extended or adjusted under 35 U.S.C. 154(b) by 0 days.

(21) Appl. No.: 18/075,879

(22) Filed: Dec. 6, 2022

(65) Prior Publication Data

US 2023/0175275 A1    Jun. 8, 2023

(30) Foreign Application Priority Data

Dec. 8, 2021 (CN) .......................... 202111512546.1

(51) Int. Cl.
*E04G 23/00* (2006.01)
*E04G 23/02* (2006.01)

(52) U.S. Cl.
CPC .............................. *E04G 23/0211* (2013.01)

(58) Field of Classification Search
CPC ..... E04G 23/00; E04G 23/02; E04G 23/0203; E04G 23/0207; E04G 23/0211
(Continued)

(56) References Cited

U.S. PATENT DOCUMENTS

| | | | |
|---|---|---|---|
| 5,624,493 A * | 4/1997 | Wagh | C04B 7/36 106/793 |
| 6,293,121 B1 * | 9/2001 | Labrador | F03D 5/00 62/304 |

(Continued)

FOREIGN PATENT DOCUMENTS

| | | |
|---|---|---|
| CN | 107965153 A | 4/2018 |
| CN | 112592132 A | 4/2021 |
| CN | 113372082 A | 9/2021 |

OTHER PUBLICATIONS

The State Intellectual Property Office of People's Republic of China; First Office Action for CN202111512546.1 (English translation); dated May 24, 2022.

(Continued)

*Primary Examiner* — Chi Q Nguyen
(74) *Attorney, Agent, or Firm* — Kirk A. Wilson; Joseph T. Guy; Patent Filing Specialist Inc.

(57) ABSTRACT

A method for reinforcing an existing stone masonry wall, wherein, the UHPC (ultra high performance concrete) material for reinforcing an existing stone masonry wall as a reinforcing material, comprising following steps: step (1): carrying out a pretreatment to the existing stone masonry wall to be reinforced; step (2): tensioning and thereby reinforcing the existing stone masonry wall pretreated in the step (1); step (3): injecting a prepared UHPC material into the mortar joint by a manual squeezing; step (4): spraying prepared UHPC material onto the existing stone masonry wall that has been treated in the step (3) by a spraying process; step (5): maintaining; the UHPC material includes:

(Continued)

550-600 kg/m³ of silicate cement, 180-200 kg/m³ of white silica fume, 510-530 kg/m³ of limestone powder, 715-735 kg/m³ of quartz sand, 60-75 kg/m³ of iron ore tailings particles, 50-60 kg/m³ of pumice particles, 15-30 kg/m³ of polycarboxylic acid water reducing agent, 230-255 kg/m³ of water and 25-35 kg/m³ of POM fiber.

9 Claims, 5 Drawing Sheets

(58) Field of Classification Search
USPC .................................................. 52/742.14
See application file for complete search history.

(56) References Cited

U.S. PATENT DOCUMENTS

| | | | |
|---|---|---|---|
| 6,845,594 B2* | 1/2005 | Harber | E04B 1/41 |
| | | | 52/715 |
| 8,844,227 B1* | 9/2014 | Ciuperca | E04C 2/288 |
| | | | 52/309.11 |
| 8,989,905 B2* | 3/2015 | Sostaric | B28B 23/0031 |
| | | | 700/265 |
| 11,358,304 B2* | 6/2022 | Mahoutian | C04B 40/0231 |
| 11,358,902 B2* | 6/2022 | Mahoutian | B28B 1/14 |
| 2002/0112427 A1* | 8/2002 | Baldwin | E04C 1/40 |
| | | | 52/607 |
| 2015/0007524 A1* | 1/2015 | Ciuperca | H05K 999/99 |
| | | | 52/742.14 |
| 2019/0241473 A1* | 8/2019 | Goerger | C04B 14/06 |

OTHER PUBLICATIONS

The State Intellectual Property Office of People's Republic of China; Notification to Grant Patent Right for CN202111512546.1 (English transl); dated Jun. 27, 2022.

* cited by examiner

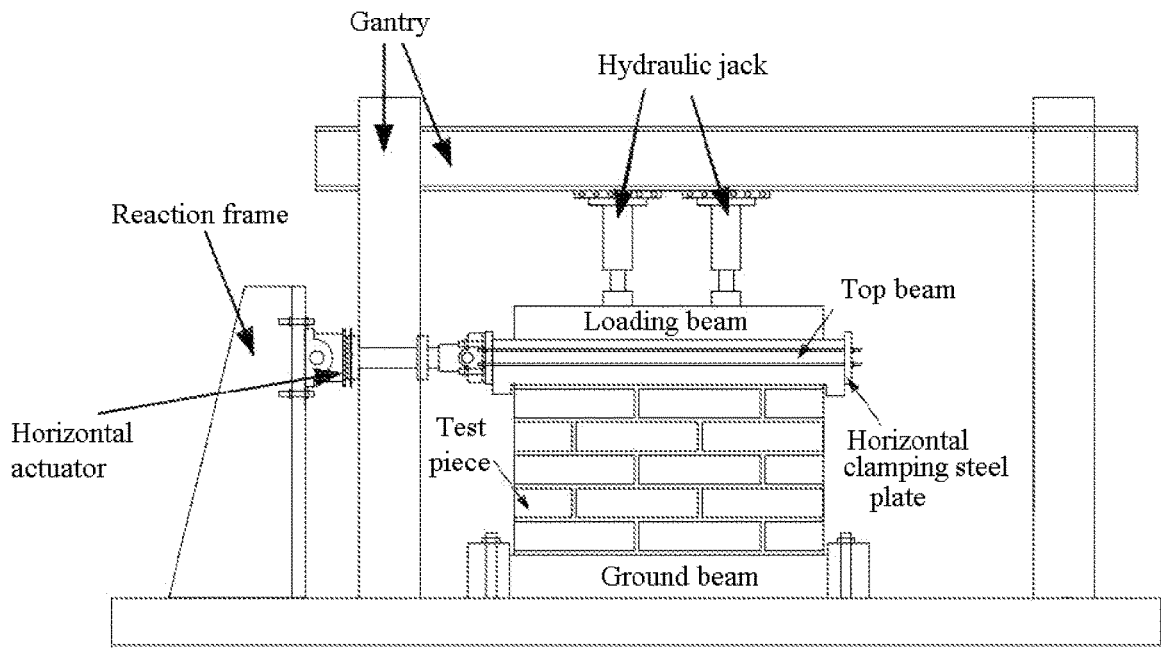

FIG. 7

| |
|---|
| Carrying out a pretreatment to the existing stone masonry wall to be reinforced |

↓

| |
|---|
| Tensioning and thereby reinforcing the existing stone masonry wall pretreated in the step (1) horizontally and vertically by a steel bar binding method |

↓

| |
|---|
| Injecting a prepared UHPC material for reinforcing the existing stone masonry wall into the mortar joint by a manual squeezing to form an embedded UHPC layer into bed joints |

↓

| |
|---|
| Spraying a prepared UHPC material for reinforcing the existing stone masonry wall onto the existing stone masonry wall that has been treated in the step (3) by a spraying process, so as to form a UHPC reinforcing surface layer |

↓

| |
|---|
| Maintaining the UHPC material for reinforcing the existing stone masonry wall |

FIG. 8

UHPC MATERIAL FOR REINFORCING EXISTING STONE MASONRY WALL AND REINFORCING METHOD THEREOF

CROSS REFERENCE TO RELATED APPLICATION

This patent application claims the benefit and priority of Chinese Patent Application No. 202111512546.1 filed on Dec. 8, 2021, the disclosure of which is incorporated by reference herein in its entirety as part of the present application.

TECHNICAL FIELD

The present disclosure relates to the technical field of wall reinforcement, in particular to a UHPC (ultra high performance concrete) material for reinforcing an existing stone masonry wall and a reinforcing method thereof.

BACKGROUND

The stone masonry wall has the advantages of good durability, easy material acquisition, low price and the like, and is widely applied to southern Fujian regions along the coast of Fujian province in China. The Minnan stone-built structure house adopts a transverse wall bearing system, and the wall is a stone masonry wall. The term "stone masonry wall" refers to an elongated stone roughly machined by a hand-held professional tool, and has a cross-sectional width and height of about 210 mm. Part of the wall is thin, only single-layer stone is used for building, the wall thickness is about 210 mm (as shown in FIG. 1), and the requirement of 240 mm of 'Fujian province stone masonry structure reinforcement technical regulation' is not met. Meanwhile, the wall is used as a load-bearing wall, not only need to bear the weight of the wall itself, but also to bear the load transferred by the beam slab, and the single thin wall weakens the seismic performance of the wall.

The prior rubble wall is built by a dry laid method with spacers. The stone wall is made of red clay mortar, so that the strength is low and weathering is severe; the horizontal mortar joint is different from the vertical mortar joint in height, and the mortar fullness is insufficient due to a dry laid method (as shown in FIG. 2). The dry laid method refers to that main stone spacers are placed at four corners of lower layer rubble, then upper layer rubble is placed on the lower layer rubble, the upper layer rubble is moved by a crowbar, main stone spacers are adjusted to achieve the leveling purpose by adjusting the main stone spacer, and after masonry is built, mortar-throwing is performed by using a special tool to throw mortar to stone seams on two sides of the masonry and simultaneously adding auxiliary stone spacers (as shown in FIG. 3). In addition, the dry-laid method with the spacers is also not within the allowable range of the national and Fujian province regulation.

The stone masonry structure house is used as a rigid structure, the wall is a main lateral force resisting component for resisting the earthquake action, earthquake damage investigation results show that the stone masonry structure is seriously damaged in the past earthquake, and the main reason for cracking and even collapsing of the stone masonry structure in the earthquake is that the shear resistance and bending resistance bearing capacity of the masonry wall are insufficient. Therefore, the anti-seismic strengthening of the existing masonry wall, the improvement of the anti-seismic performance and durability of the wall, and improvement of the integrity of a masonry structure house are pressing problem to be solved.

SUMMARY

In view of the above disadvantages, the present disclosure aims to provide a UHPC material for reinforcing existing stone masonry walls and a reinforcing method thereof. The disclosure adopts the combination of an improved novel UHPC (ultra high performance concrete) section enlarging method and a steel bar binding method to reinforce the existing stone masonry wall, thereby increasing the thickness of the rubble wall and improving the stability of the rubble wall; the anti-seismic performance and durability are obviously improved, the construction is convenient, and the method can be widely applied to anti-seismic reinforcement of the stone masonry wall.

In order to achieve the purpose, the disclosure adopts the following technical solutions:

A UHPC (ultra high performance concrete) material for reinforcing an existing stone masonry wall, comprising, calculated according to an amount per cubic meter, 550-600 $kg/m^3$ of silicate cement, 180-200 $kg/m^3$ of white silica fume, 510-530 $kg/m^3$ of limestone powder, 715-735 $kg/m^3$ of quartz sand, 60-75 $kg/m^3$ of iron ore tailing particles, 50-60 $kg/m^3$ of pumice particles, 15-30 $kg/m^3$ of polycarboxylic acid water reducing agent, 230-255 $kg/m^3$ of water and 25-35 $kg/m^3$ of POM (polyformaldehyde) fibers.

Furthermore, the above-mentioned UHPC material for reinforcing an existing stone masonry wall preferably comprises, calculated according to the amount per cubic meter, 580 $kg/m^3$ of silicate cement, 193.3 $kg/m^3$ of white silica fume, 515.6 $kg/m^3$ of limestone powder, 725.7 $kg/m^3$ of quartz sand, 70 $kg/m^3$ of iron ore tailing particles, 55 $kg/m^3$ of pumice particles, 20 $kg/m^3$ of polycarboxylic acid water reducer, 249.9 $kg/m^3$ of water and 28.2 $kg/m^3$ of POM fibers.

Further, an average particle size of the pumice particles and the iron ore tailing particles is 2-8 mm; preferably 3-6 mm; most preferably 5 mm.

Further, the POM fibers have a diameter of 0.1 to 0.3 mm; preferably 0.2 mm.

Further, the white silica fume is preferably zirconia silica fume.

In the present disclosure, the UHPC material for reinforcing the existing stone masonry wall can be selected from conventional commercial products in the field, such as pumice particles, polycarboxylic acid water reducing agents, POM fibers, etc., if not specially limited; meanwhile, the UHPC material for reinforcing the stone masonry wall can be prepared by stirring and mixing according to the conventional method in the field.

The disclosure provides a method for reinforcing an existing stone masonry wall by using the UHPC material for reinforcing an existing stone masonry wall as a reinforcing material.

Further, the method for reinforcing the existing stone masonry wall comprises the following steps:

step (1): carrying out a pretreatment to the existing stone masonry wall to be reinforced, wherein the pretreatment comprises: keeping a main spacer between an upper layer of the regular rubble and a lower layer of the regular rubble and cleaning mortar joints;

step (2): tensioning and thereby reinforcing the existing stone masonry wall pretreated in the step (1) horizontally and vertically by a steel bar binding method;

step (3): injecting a prepared UHPC material for reinforcing the existing stone masonry wall into the mortar joint by a manual squeezing to form an embedded UHPC layer into the bed joints;

and (4): spraying prepared UHPC material for reinforcing the existing stone masonry wall that has been treated in the step (3) by a spraying process, so as to form a UHPC reinforcing surface layer;

step (5): maintaining.

Further, a pretreatment process in the step (1) further comprises: after cleaning mortar joints, coating a layer of cement paste or interface binder on a surface of the existing stone masonry wall to be reinforced.

The interface bonding performance of the wall and a subsequent UHPC reinforced surface layer can be further enhanced by coating a layer of cement paste or interface bonding agent; the interface bonding agent of the present disclosure may be commercially available products commonly used in the art.

Further, a process of tensioning and thereby reinforcing by using a steel bar binding method in the step (2) is as follows: penetrating a mortar joint of a wall with a steel bar (usually 25-35 mm), binding the regular rubble (each 3-4 layers are one bundle, one layer of regular rubble is lapped between the upper bundle and the lower bundle), an interval between adjacent vertical binding bands is s; evenly arranging horizontal steel bars at a distance h, and welding and connecting the horizontal steel bars with vertical steel bar binding bands; wherein s is not greater than 400 mm; h is not greater than 500 mm; a diameter of the steel bar is not less than 10 mm.

Further, an average thickness of the UHPC reinforcing surface layer in step (4) is 25-35 mm, and preferably 30 mm.

It should be noted that, the method for reinforcing the existing stone masonry wall in the present disclosure can be performed by the conventional steps in the art, if not limited, for example, the maintenance can be performed by using the conventional wet water for 28 days.

In summary, the present disclosure has the following advantages:

1. In order to enable the used UHPC material to be better suitable for reinforcing the existing stone masonry wall, compared with the conventional UHPC material, the UHPC material is optimized, and iron ore tailing particles and pumice particles are added on the basis of selecting white silica fume, limestone powder and quartz sand as fine aggregates; the method mainly comprises the following steps:

1) by utilizing the characteristics of porosity, light weight and water absorption of pumice particles, the pumice particles serving as the internal maintenance material of the UHPC material can promote the early hydration of UHPC and the secondary hydration of fine aggregates such as white silica fume, limestone powder, quartz sand and the like, thereby improving the mechanical property of the UHPC material; more importantly, the pumice stone particles delay the self-drying of the UHPC through the slow release effect of water, have better volume stability in the processes of water absorption and release, increase the fluidity and adaptability of the UHPC material, and ensure that the sprayed UHPC material and the existing regular rubble stone wall have better cohesiveness;

2) according to the disclosure, the dosage ratio of the pumice particles to the polycarboxylic acid water reducing agent is proper (50-60: 15-30), so that negative effects such as porosity increase and the like caused by compactness of UHPC due to introduction of the polycarboxylic acid water reducing agent can be effectively avoided, the durability of the UHPC is improved, and the plumpness of the reinforced existing stone masonry wall is good;

3) on one hand, the hydration synergistic effect among the added minerals is enhanced by matching with fine aggregates such as white silica fume, limestone powder, quartz sand and the like, so that the shearing resistance and bending resistance bearing capacity of the existing stone masonry wall can be improved, and the anti-seismic performance of the existing stone masonry wall is improved; further, the dosage ratio of fine aggregates such as iron ore tailing particles, white silica fume, limestone powder, quartz sand and the like is proper, so that the mechanical property of the UHPC material is equivalent to that of undegraded stones (the compressive strength is usually over 80 MPa), and the integral stability of the stone-structure house is improved.

2. The disclosure provides a method for reinforcing an existing stone masonry wall, which is characterized in that an improved novel UHPC (ultra high performance concrete) section increasing method and a steel bar binding method are combined to reinforce the existing stone masonry wall, so that the thickness of the stone masonry wall can be increased, and the stability of the wall can be improved; the anti-seismic performance and the durability are obviously improved, the construction is convenient, and the method can be widely applied to anti-seismic and reinforcement of the stone masonry wall; the specific process is as follows:

1) the mechanical property of the UHPC material is equivalent to that of un-weathered stones (the compressive strength is usually over 80 MPa), the surface of the rough finishing stones is rough (the surface unevenness is within +/−15 mm, and the relation between the upper layer and the lower layer of the rough finishing stones is shown in FIG. 4), and the UHPC material and the rough finishing stones can better cooperate to work, so that high-degree material combination fusion is realized; the UHPC material has good fluidity and can fully contact with the surfaces of the upper and lower layer rough stones, so that the stress and the force transmission are reliable, and the UHPC material and the stone material have excellent interface bonding performance;

2) the reinforcing steel bar binding belt can tightly tie all parts of the stone masonry wall and can be tensioned and reinforced in a horizontal and vertical mode, so that the upper and lower layer stones of the wall are more stable; further, the reinforcing steel bar binding bands form a reinforcing steel bar framework, so that the wall and the reinforcing steel bar binding bands can be stressed together;

3) the UHPC cross section enlarging method and the reinforcing steel bar binding method which improve the formula are used for reinforcing the existing stone masonry wall, and the UHPC reinforcing surface layer, the embedded UHPC layer into the bed joints, the reinforcing steel bar binding and the original rubble wall are organically combined to form a novel combined structure which has the advantages of meeting the standard requirements on thickness, large rigidity, high bearing capacity, strong shearing resistance and good integrity.

BRIEF DESCRIPTION OF THE DRAWINGS

FIG. 7 is a schematic diagram of a test piece and a test loading device according to the present disclosure.

FIG. 8 is a flow chart diagram of the steps of the method according to the present disclosure

DETAILED DESCRIPTION OF THE EMBODIMENTS

In order to make the objects, technical solutions and advantages of the present disclosure more apparent, the present disclosure is further described in detail with reference to the following embodiments. It should be understood that the detailed description and specific examples, while indicating embodiments of the disclosure, are given by way of illustration only, not by way of limitation, i.e., the embodiments described are intended as a selection of the best mode contemplated for carrying out the disclosure, not as a full mode.

Thus, the following detailed description of the embodiments of the present disclosure is not intended to limit the scope of the disclosure as claimed, but is merely representative of selected embodiments of the disclosure. All other embodiments, which can be derived by a person skilled in the art from the embodiments of the present disclosure without making any creative effort, shall fall within the protection scope of the present disclosure.

Embodiment 1

Figure 5:
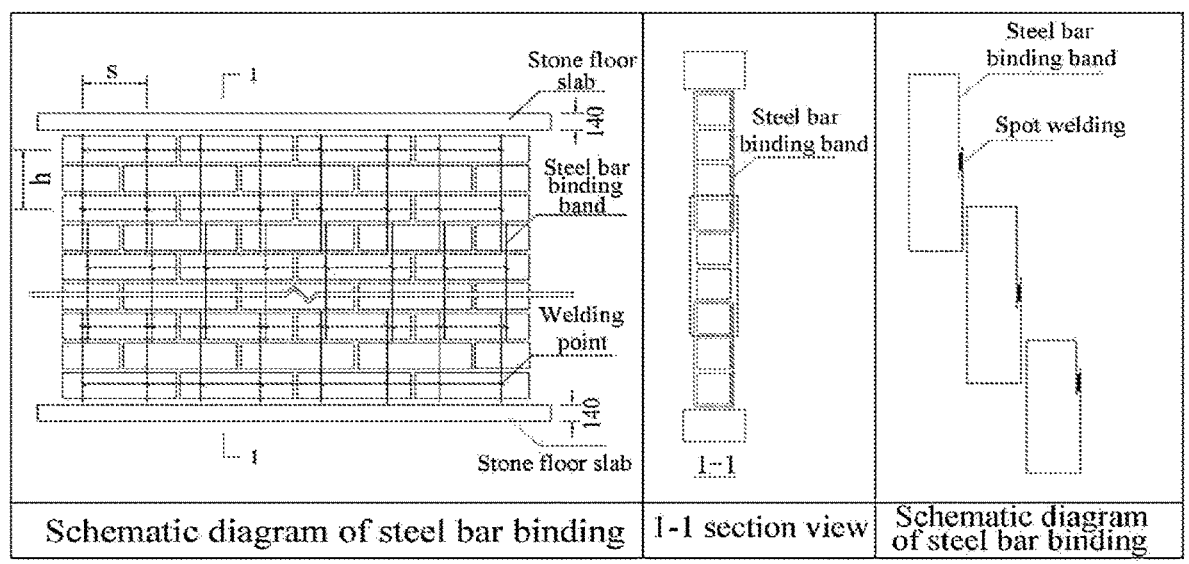
FIG. 5 is a schematic view of the process of steel bar binding according to the present disclosure.

The embodiment provides a method for reinforcing an existing stone masonry wall, which comprises the following steps:

step (1): carrying out a pretreatment to the existing stone masonry wall to be reinforced, comprising: determining the position of the main spacer, protecting the main spacer, removing a plurality of auxiliary stone spacers (keeping auxiliary stone spacers which are difficult to remove) by using a chisel, and digging out partial red clay mortar in the mortar joint; cleaning dust in the mortar joint, and coating a layer of cement paste on the surface of the wall to be reinforced for enhancing the interface bonding performance of the wall and the reinforcing surface layer;

step (2): tensioning and thereby reinforcing the existing stone masonry wall pretreated in the step (1) horizontally and vertically by a steel bar binding method; the specific process is as follows: performing tightening and reinforcing horizontally and vertically. Penetrating a mortar joint of a wall by using steel bars (the diameter of each steel bar is 15 mm), binding the regular rubble (each 3-4 layers are one bundle, one layer of regular rubble is lapped between the upper bundle and the lower bundle), and an interval between adjacent vertical binding bands is s(s is 400 mm). Evenly arranging horizontal steel bars at a distance h (h is 500 mm), and welding and connecting the horizontal steel bars with a vertical steel bar binding bands (as shown in FIG. 5);

step (3): preparing UHPC material for an existing stone masonry wall; the specific process is as follows: 580 kg/m$^3$ of silicate cement (42.5 R), 193.3 kg/m$^3$ of white silica fume (particularly zirconia silica fume), 515.6 kg/m$^3$ of limestone powder, 725.7 kg/m$^3$ of quartz sand, 70 kg/m$^3$ of iron ore tailing particles (with the average particle size of 5 mm), 55 kg/m$^3$ of pumice particles (with the average particle size of 5 mm), 20 kg/m$^3$ of polycarboxylic acid water reducer and 249.9 kg/m$^3$ of water are added into a forced mixer to be continuously stirred for 15 minutes, and then 28.2 kg/m$^3$ of POM fiber (with the diameter of 0.2 mm) are added into the forced mixer through multiple times to be continuously stirred for 10 minutes;

and (4): injecting the prepared UHPC material for reinforcing the existing stone masonry wall into the mortar joint by a manual squeezing to form an embedded UHPC layer into the bed joints;

and (5): spraying prepared UHPC material for reinforcing the existing stone masonry wall onto the existing stone masonry wall that has been treated in the step (3) by a spraying process, and forming a UHPC reinforcing surface layer with the average thickness of 30 mm;

and (6): water maintaining for 28 days.

Figure 6:
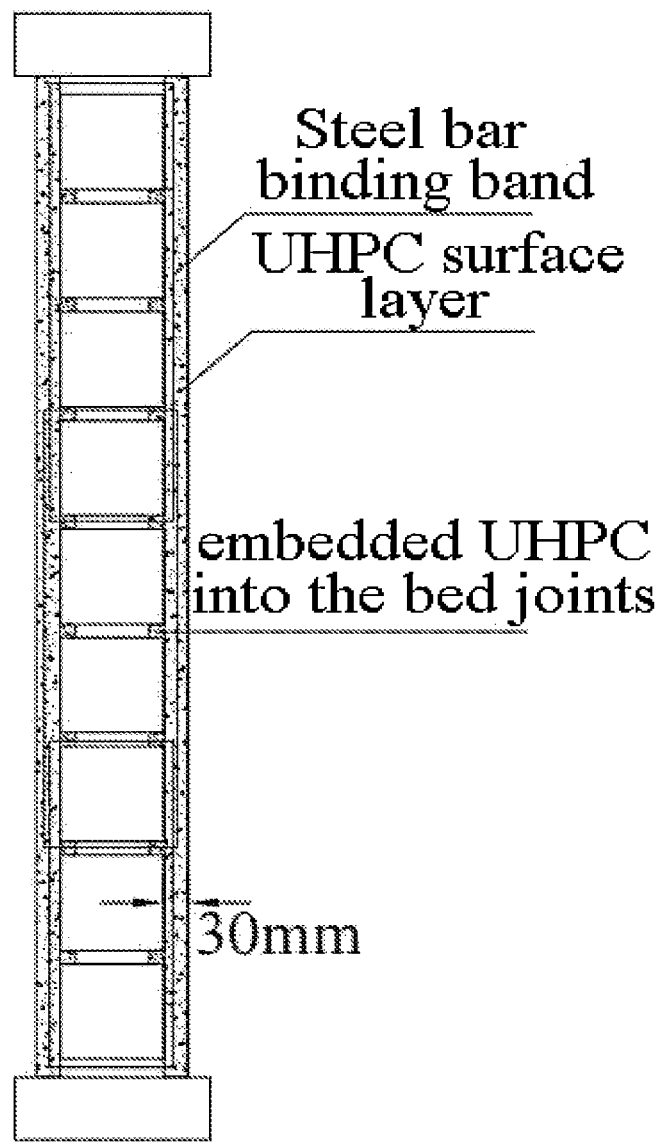
FIG. 6 is a schematic cross-sectional view of a double-sided reinforcement of an existing stone masonry wall of the present disclosure.

FIG. 6 shows a cross-sectional view of the double-sided reinforcement of the existing stone masonry wall reinforced by the existing stone masonry wall reinforcing method in this example; in this example, if there is no particular limitation on the raw materials, commercially available products or conventional methods in the art can be directly selected; in this example, if there is no particular limitation to the procedure, the conventional procedures in the art can be used, and the description is not repeated.

Embodiment 2

This Embodiment provides a method for reinforcing an existing stone masonry wall, which differs from Embodiment 1 only in that: the UHPC material that is used for reinforcing the existing stone masonry wall, according to the amount per cubic meter, includes: 550 kg/m$^3$ of silicate cement, 200 kg/m$^3$ of white silica fume, 530 kg/m$^3$ of limestone powder, 735 kg/m$^3$ of quartz sand, 75 kg/m$^3$ of iron ore tailing particles, 60 kg/m$^3$ of pumice particles, 30 kg/m$^3$ of polycarboxylic acid water reducing agent, 255 kg/m$^3$ of water and 25 kg/m$^3$ of POM fibers; the rest steps and parameters are the same.

Embodiment 3

This Embodiment provides a method for reinforcing an existing stone masonry wall, which differs from Embodiment 1 only in that: the UHPC material that is used for reinforcing the existing stone masonry wall, according to the amount per cubic meter, includes: 600 kg/m$^3$ of silicate cement, 180 kg/m$^3$ of white silica fume, 510 kg/m$^3$ of limestone powder, 715 kg/m$^3$ of quartz sand, 60 kg/m$^3$ of iron ore tailing particles, 50 kg/m$^3$ of pumice particles, 15 kg/m$^3$ of polycarboxylic acid water reducing agent, 230 kg/m$^3$ of water and 35 kg/m$^3$ of POM fibers; the rest steps and parameters are the same.

Comparative Example 1

This example provides a method for reinforcing an existing stone masonry wall, which differs from Embodiment 1 only in that: the UHPC material that is used for reinforcing the existing stone masonry wall does not contain pumice particles; the rest steps and parameters are the same.

Comparative Example 2

This example provides a method for reinforcing an existing stone masonry wall, which differs from example 1 only in that: the UHPC material that is used for reinforcing the existing stone masonry wall does not contain iron ore tailing particles; the rest steps and parameters are the same.

Comparative Example 3

This example provides a method for reinforcing an existing stone masonry wall, which differs from Embodiment 1 only in that: the preparation process of the used UHPC material for reinforcing the stone masonry wall comprises: 580 kg/m³ of silicate cement (42.5 R), 193.3 kg/m³ of white silica fume (specifically, zirconia silica fume), 515.6 kg/m³ of limestone powder, 725.7 kg/m³ of quartz sand, 70 kg/m³ of iron ore tailing particles (with the average particle size of 5 mm), 55 kg/m³ of pumice particles (with the average particle size of 5 mm), 40 kg/m³ of polycarboxylic acid water reducer and 249.9 kg/m³ of water are added into a forced mixer to be continuously stirred for 15 minutes, and then 28.2 kg/m³ of POM fiber (with the diameter of 0.2 mm) are added into the forced mixer through multiple times to be continuously stirred for 10 minutes; the rest steps and parameters are the same.

Comparative Example 4

This example provides a method for reinforcing an existing stone masonry wall, which differs from Embodiment 1 only in that: the preparation process of the used UHPC material for reinforcing the stone masonry wall comprises: 580 kg/m³ of silicate cement (42.5 R), 193.3 kg/m³ of white silica fume (specifically, zirconia silica fume), 515.6 kg/m³ of slag ash, 725.7 kg/m³ of quartz sand, 70 kg/m³ of iron ore tailing particles (with the average particle size of 5 mm), 55 kg/m³ of pumice particles (with the average particle size of 5 mm), 40 kg/m³ of polycarboxylic acid water reducer and 249.9 kg/m³ of water are added into a forced mixer to be continuously stirred for 15 minutes, and then 28.2 kg/m³ of POM fiber (with the diameter of 0.2 mm) are added into the forced mixer through multiple times to be continuously stirred for 10 minutes; the rest steps and parameters are the same.

Experimental Examples

This example uses a mixed force-displacement controlled loading method for the horizontal low circumference repeated tests of the stone masonry wall after reinforcement of Examples 1-3 and Comparative example 1-4 (the wall size is 2160×1200×210 mm (length×height×thickness), each test piece is composed of a reinforced concrete ground beam, a reinforced regular rubble masonry wall, and a steel bar-concrete top beam, and the schematic view of the test loading device is shown in FIG. 7), and the test results are shown in table 1.

TABLE 1

| Number | Load of cracking | Displacement of cracking | Ultimate load | Ultimate displacement | Coefficient of ductility |
|---|---|---|---|---|---|
| Embodiment 1 | 175 KN | 0.51 mm | 421 KN | 8.21 mm | 22.34 |
| Embodiment 2 | 170 KN | 0.57 mm | 405 KN | 7.94 mm | 21.58 |
| Embodiment 3 | 172 KN | 0.50 mm | 411 KN | 8.01 mm | 21.03 |
| Comparative example 1 | 103 KN | 0.33 mm | 305 KN | 8.06 mm | 15.13 |
| Comparative example 2 | 97 KN | 0.29 mm | 287 KN | 7.67 mm | 15.78 |
| Comparative example 3 | 100 KN | 0.31 mm | 293 KN | 8.11 mm | 14.63 |
| Comparative example 4 | 95 KN | 0.25 mm | 280 KN | 7.93 mm | 14.39 |

Figure 1:
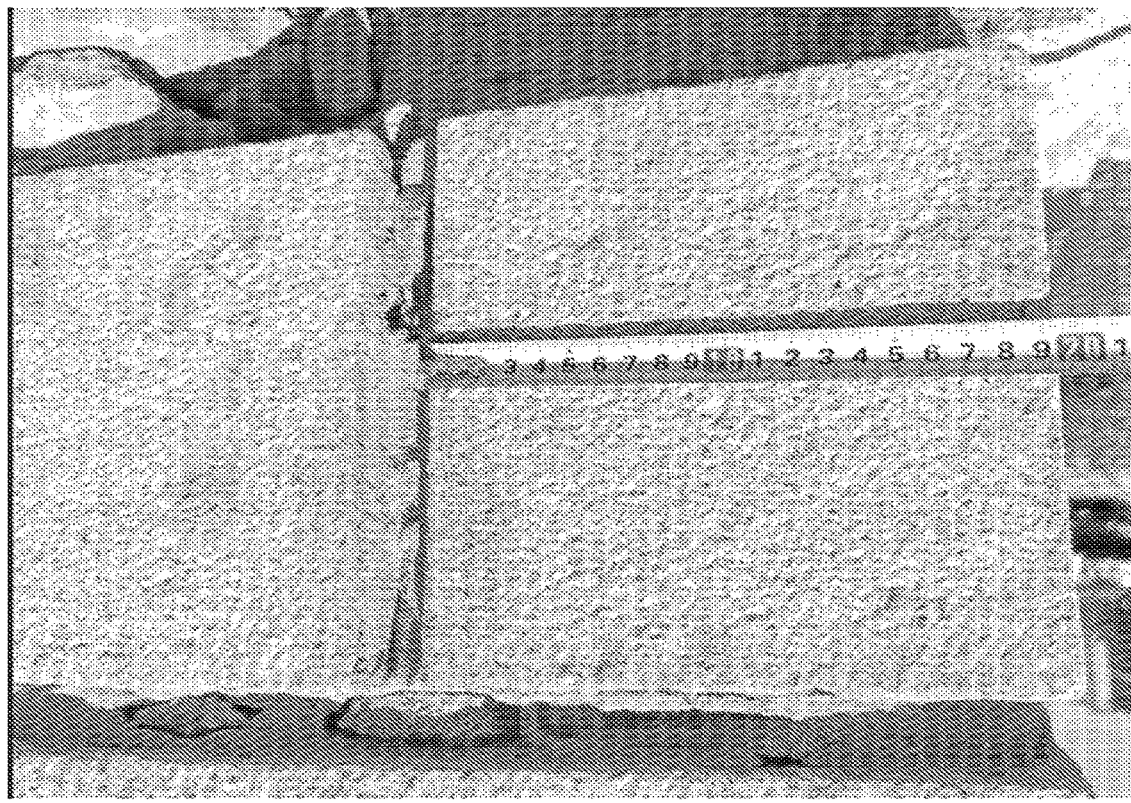
FIG. 1 is a diagram showing the thickness of an existing stone masonry wall of the present disclosure.
Figure 2:
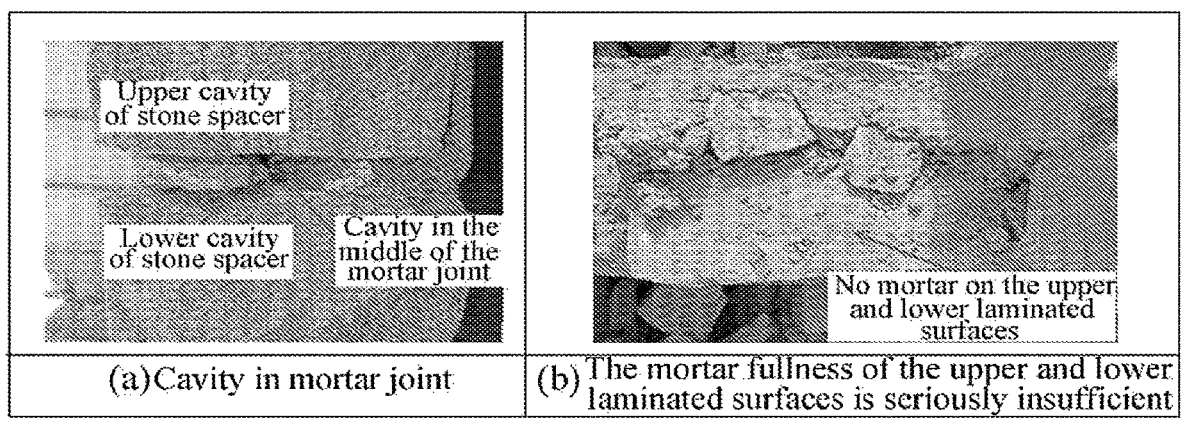
FIG. 2 is a schematic view of existing stone masonry wall of the present disclosure (mortar joint fullness is poor)
Figure 3:
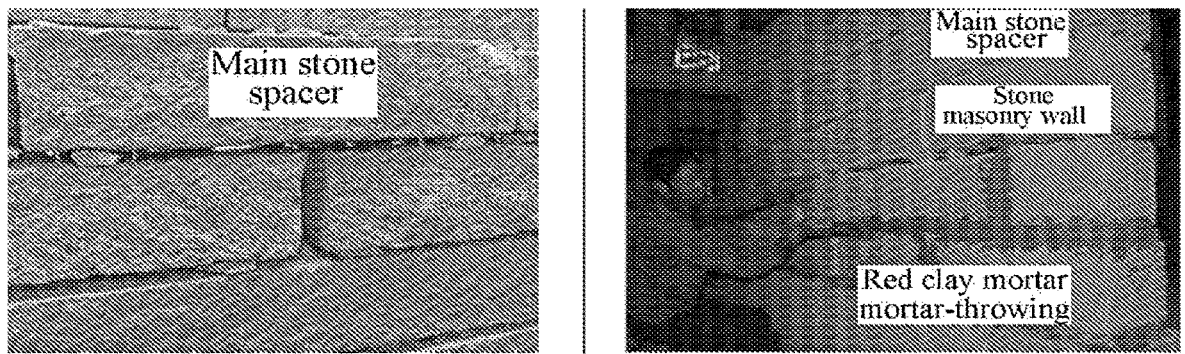
FIG. 3 is a diagram of a masonry process of existing stone masonry wall according to the present disclosure.
Figure 3:
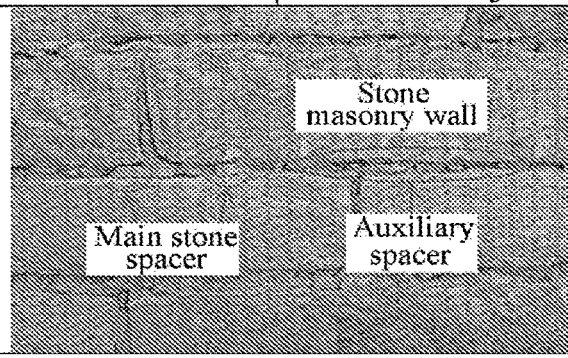
Figure 4:
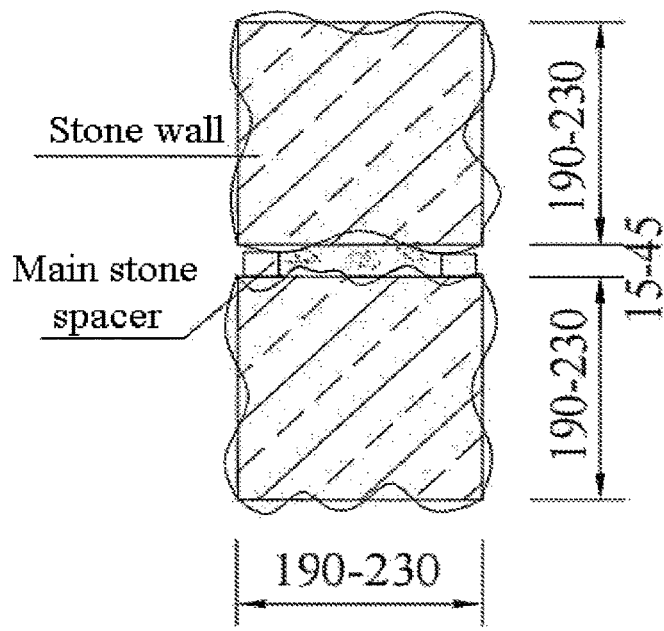
FIG. 4 is a schematic view showing the relationship between the upper and lower layers of regular rubbles according to the present disclosure.

As can be seen from table 1, the disclosure provides a method for reinforcing an existing stone masonry wall, the used UHPC material can be better suitable for reinforcing the existing stone masonry wall, compared with the conventional UHPC material, the method is optimized, and iron ore tailing particles and pumice stone particles are added on the basis of selecting white silica fume, limestone powder and quartz sand as fine aggregates; the mechanical property of the UHPC material is equivalent to that of an un-weathered stone (the compressive strength is usually over 80 MPa), the surface of the regular rubble is rough (the surface unevenness is within +/−15 mm, and the relation between the upper layer and the lower layer of the regular rubble is shown in a FIG. 4), the UHPC material can better cooperate with the regular rubble, and high-degree material combination fusion is realized; the UHPC material has good fluidity and can fully contact with the surfaces of the upper and lower layer regular rubble so that the stress and the force transmission are reliable, and the UHPC material and the stone material have excellent interface bonding performance and can be more suitable for reinforcing the existing stone masonry wall. When the UHPC material is not added with iron ore tailing particles (comparative example 2), pumice particles (comparative example 1), the dosage ratio of the pumice particles and the polycarboxylic acid water reducer is changed (comparative example 3) and the used fine aggregate component is changed (comparative example 4), the applicability of the prepared UHPC material to the existing stone masonry wall and the cooperativity of the UHPC material and the existing stone masonry wall are influenced, so that the reinforcing effect is reduced.

In conclusion, the disclosure adopts the combination of the improved novel UHPC (ultra high performance concrete) section enlarging method and the steel bar binding method to reinforce the existing stone masonry wall, thereby increasing the thickness of the rubble wall and improving the stability of the rubble wall; the anti-seismic performance and durability are obviously improved, the construction is convenient, and the method can be widely applied to anti-seismic reinforcement of the stone masonry wall.

The foregoing is illustrative and explanatory of the present disclosure, and any modification or addition to the specific embodiment described or substitution in a similar manner by a person skilled in the art without creative labor is still fall into the scope of protection of the present disclosure.

What is claimed is:
1. A method for reinforcing an existing stone masonry wall, wherein, the UHPC (ultra high performance concrete) material for reinforcing an existing stone masonry wall as a reinforcing material, comprising following steps of:
   step (1): carrying out a pretreatment to the existing stone masonry wall to be reinforced, wherein the pretreatment comprises keeping a main spacer between an upper layer of regular rubble and a lower layer of regular rubble and cleaning mortar joints;

step (2): tensioning and thereby reinforcing the existing stone masonry wall pretreated in the step (1) horizontally and vertically by a steel bar binding method;

step (3): injecting a prepared UHPC material for reinforcing the existing stone masonry wall into the mortar joints by a manual squeezing to form an embedded UHPC layer into bed joints;

step (4): spraying the prepared UHPC material for reinforcing the existing stone masonry wall onto the existing stone masonry wall that has been treated in the step (3) by a spraying process, so as to form a UHPC reinforcing surface layer;

step (5): maintaining;

the UHPC material for reinforcing the existing stone masonry wall, comprising, calculated according to an amount per cubic meter, 550-600 kg/m$^3$ of silicate cement, 180-200 kg/m$^3$ of white silica fume, 510-530 kg/m$^3$ of limestone powder, 715-735 kg/m$^3$ of quartz sand, 60-75 kg/m$^3$ of iron ore tailing particles, 50-60 kg/m$^3$ of pumice particles, 15-30 kg/m$^3$ of polycarboxylic acid water reducing agent, 230-255 kg/m$^3$ of water and 25-35 kg/m$^3$ of POM (polyformaldehyde) fibers.

2. The method for reinforcing an existing stone masonry wall according to claim 1, comprising, calculated according to the amount per cubic meter, 580 kg/m$^3$ of silicate cement, 193.3 kg/m$^3$ of white silica fume, 515.6 kg/m$^3$ of limestone powder, 725.7 kg/m$^3$ of quartz sand, 70 kg/m$^3$ of iron ore tailing particles, 55 kg/m$^3$ of pumice particles, 20 kg/m$^3$ of polycarboxylic acid water reducer, 249.9 kg/m$^3$ of water and 28.2 kg/m$^3$ of POM fibers.

3. The method for reinforcing an existing stone masonry wall according to claim 2, wherein, an average particle size of the pumice particles and the iron ore tailing particles is 2-8 ram.

4. The method for reinforcing an existing stone masonry wall according to claim 2, wherein, the POM fibers have a diameter of 0.1 to 0.3 mm.

5. The method for reinforcing an existing stone masonry wall according to claim 1, wherein, an average particle size of the pumice particles and the iron ore tailing particles is 2-8 mm.

6. The method for reinforcing an existing stone masonry wall according to claim 1, wherein, the POM fibers have a diameter of 0.1 to 0.3 mm.

7. The method for reinforcing an existing stone masonry wall according to claim 1, wherein, a pretreatment process in the step (1) further comprises: after cleaning mortar joints, coating a layer of cement paste or interface binder on a surface of the existing stone masonry wall to be reinforced.

8. The method for reinforcing an existing stone masonry wall according to claim 1, wherein, a process of tensioning and thereby reinforcing by using a steel bar binding method in the step (2) is as follows: penetrating a mortar joint of a wall with a steel bar, binding the regular rubble, wherein an interval between adjacent vertical binding bands is s; evenly arranging horizontal steel bars at a distance h, and welding and connecting the horizontal steel bars with vertical steel bar binding bands; wherein the interval s is not greater than 400 mm; the distance h is not greater than 500 mm; a diameter of the steel bar is not less than 10 mm.

9. The method for reinforcing an existing stone masonry wall according to claim 1, wherein, an average thickness of the UHPC reinforcing surface layer in step (4) is 25-35 mm.

* * * * *